July 14, 1953        A. C. HEEHLER        2,645,762

SHOCKPROOF MOUNTING FOR WARNING LIGHTS

Filed May 14, 1951        2 Sheets-Sheet 1

Inventor
Arthur C. Heehler

July 14, 1953
A. C. HEEHLER
2,645,762
SHOCKPROOF MOUNTING FOR WARNING LIGHTS
Filed May 14, 1951
2 Sheets-Sheet 2
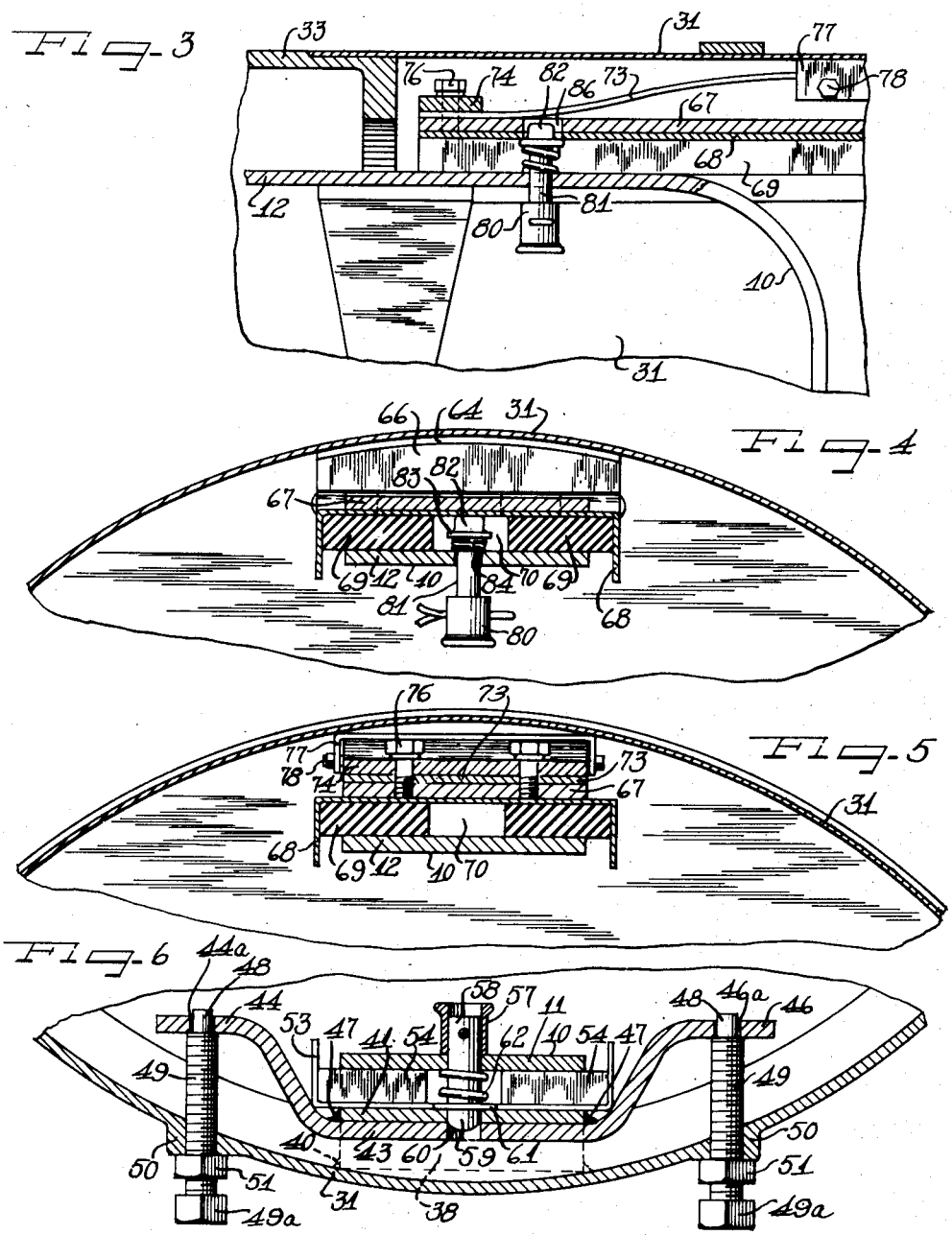
Inventor
Arthur C. Heehler Patented July 14, 1953

2,645,762

UNITED STATES PATENT OFFICE 2,645,762

SHOCKPROOF MOUNTING FOR WARNING LIGHTS

Arthur C. Heehler, Chicago, Ill., assignor to The Pyle-National Company, Chicago, Ill., a corporation of New Jersey Application May 14, 1951, Serial No. 226,143

13 Claims. (Cl. 340—50)

This invention relates generally to illumination apparatus and more particularly to an improved shockproof mounting wherein a warning light apparatus may be floatingly retained in adjustable assembly within a casing enclosure.

Although the principles of the present invention are of general utility, they find a particularly useful application when employed in connection with a shockproof mounting for a warning light of the type used in connection with movable vehicles such as railroad locomotives and the like.

In the warning light art as heretofore developed, various types of warning lights and mounting structures therefor have been provided whereby a beam of light may be projected in a movable pattern. Such warning light apparatus has been advantageously used in connection with movable vehicles such as railway locomotives because the movable beam pattern creates a spectacular sky effect and also moves relative to the roadway upon which the locomotive is traveling, thereby serving to improve the warning characteristics of the projected beam of light. Most frequent use is made of such warning light apparatus on diesel-type locomotives which enjoy the transmission of a uniform driving effort to the locomotive trucks, thereby minimizing excessive vibrations which are likely to have a deteriorative effect on the efficient operation of a warning light apparatus.

Although steam-type locomotives are still widely used, the application of a warning light apparatus capable of projecting a beam of light in a moving pattern to a steam-type locomotive has not been heretofore successful. The high vibration level and other operating characteristics which distinguish the steam-type locomotive from the well known diesel units result in the establishment of such a severe operating environment as to render the use of modern warning light apparatus virtually impossible.

In accordance with the principles of the present invention, an improved mounting arrangement is provided for a warning light apparatus wherein a warning light capable of projecting a beam of light in a movable pattern may be floatingly suspended in adjustable assembly within a casing of the type which is readily utilized in connection with a steam-type locomotive.

More particularly, the present invention contemplates the provision of a pivotally mounted cradle assembly situated in the bottom of a casing open at one end and having a shockproof cushion carried thereby to receive a warning light inserted into the casing. A hinge plate is pivotally connected to the top of the casing and is urged into engagement with the warning light by means of a resilient biasing spring, thereby to floatingly suspend the warning light in adjustable assembly within the casing. A cushioning pad is arranged between the warning light and the hinge plate and cushioning means may also be provided between the closed end of the casing and the warning light to minimize the transmission of vibration interferences to the components of the warning light apparatus.

In order to selectively adjust the relative alignment between the beam of light projected by the warning light apparatus and the casing, the cradle assembly mounting the warning light may be vertically positioned and retained in selected vertical positions by suitable locking means.

It is an object of the present invention, therefore, to provide an improved shockproof mounting arrangement for a warning light apparatus to extend the advantageous use of warning light apparatus in operating environments which have heretofore been incompatible with such use.

Another object of the present invention is to provide a shockproof mounting for a warning light wherein a warning light apparatus may be floatingly suspended in adjustable assembly within a casing.

Another object of the present invention is to provide improved beam adjustment device to relatively align the beam of light projected by a warning light apparatus with respect to the casing enclosing the apparatus.

Many other advantages, features and objects of the present invention will become manifest to those versed in the art upon making reference to the detailed description which follows and the accompanying sheets of drawings in which a preferred structural embodiment incorporating the principles of the present invention is shown by way of illustrative example.

On the drawings:

Figure 3 is a fragmentary cross-sectional view with parts shown in elevation showing a warning light apparatus partially withdrawn from a casing structure incorporating the mounting arrangement provided in accordance with the principles of the present invention and illustrating the safety lock feature to be described hereinafter;

Figure 4 is a fragmentary cross-sectional view with parts shown in elevation taken substantially on line IV—IV of Figure 1;

Figure 5 is a fragmentary cross-sectional view taken substantially on line V—V of Figure 1; and Figure 6 is a fragmentary cross-sectional view taken substantially on line VI—VI of Figure 1.

As shown on the drawings:

The warning light apparatus provided in accordance with the principles of the present invention is of the type adapted to project a movable beam of light through a predetermined pattern so that a spectacular sky effect will be created and so that the visibility and warning characteristics of the light beam will be improved.

Figure 1:
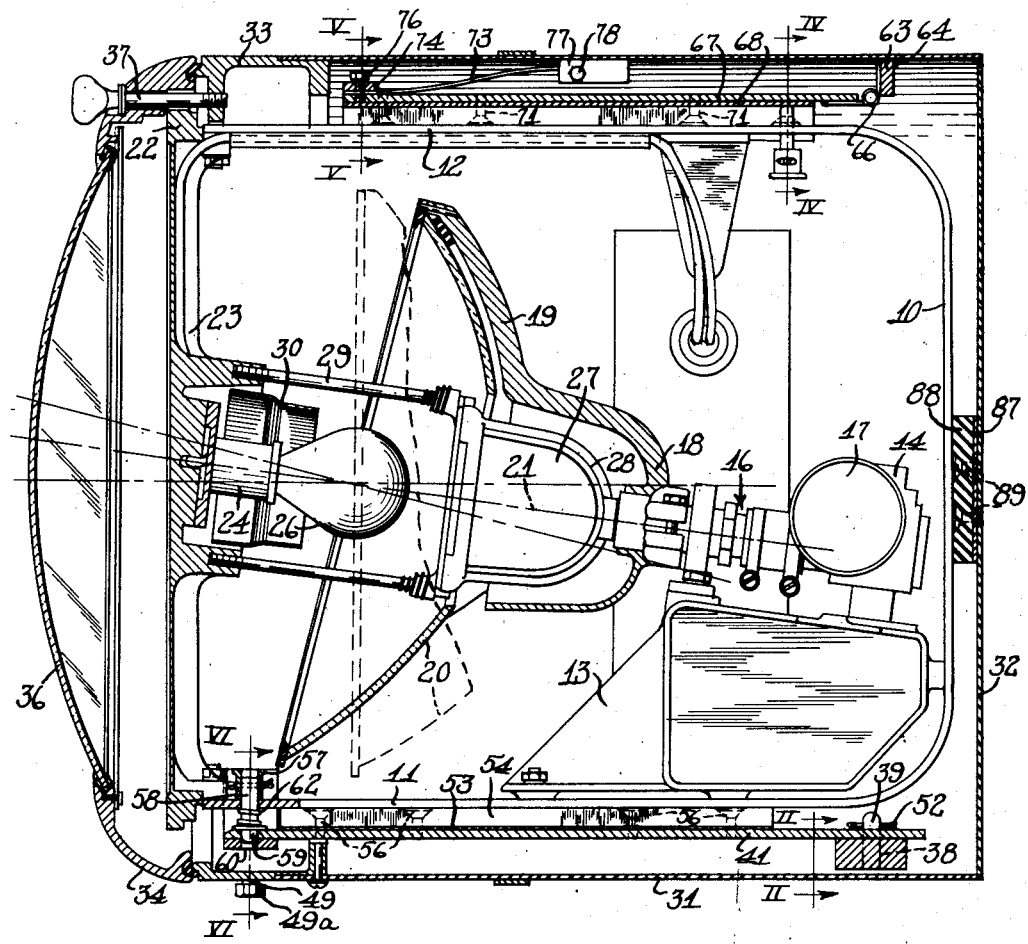
Figure 1 is a cross-sectional view with parts shown in elevation of a warning light apparatus including the shockproof mounting arrangement provided in accordance with the principles of the present invention.

In Figure 1 is shown a warning light apparatus comprising a frame 10 consisting of a U-shaped strip of metal having a first leg 11 and a second leg 12.

A mounting shoe 13 is firmly connected to the leg 11 of the frame 10 and supports a prime mover which takes the form of an electric motor 14 arranged to selectively rotate in opposite directions a power delivery shaft mechanism indicated generally at 16 through a gear reduction box 17.

A spider 18 is rotatably driven by the power delivery shaft mechanism 16 and includes a plurality of radially extending arms 19 constructed to support a parabolic reflector 20 in eccentrically offset relationship relative to an axis of rotation 21 established by the power delivery shaft mechanism 16.

A front ring 22 is carried on the ends of the legs 11 and 12 of the frame 10 and includes a diametrically extending front support 23 provided to carry a light source in spaced apart relation relative to the reflector 20. In this particular embodiment, a socket 24 is mounted on the front support 23 and receives an incandescent bulb 26. The bulb 26 is arranged to have its filament lie at the focal center of the reflector 20. Thus, a light of emission emanating from the bulb 26 will be reflected by the reflector 20 outwardly through the front ring 22.

In order to selectively change the color of the projected beam of light, a color filter mechanism is provided which is actuated in response to the direction of rotation of the motor 14, the color filter mechanism including a cup-shaped color filter 27 retained in a color filter holder 28 and movable in a reciprocable path determined by a pair of guide rods 29 by means of an actuator connecting the color filter holder 28 to the power delivery shaft mechanism 16. In order to prevent stray rays of light from entering the colored beam pattern, the reflector shield 30 is provided to enclose the socket 24 and the lower portion of the bulb 26.

The warning light described thus far is inserted into a casing 31 having a closed end 32 and an open end bounded by a mounting ring 33. A lens door 34 is hingedly connected to the mounting ring 33 and carries a lens 36, the warning light adapted to project the beam of light outwardly of the open end of the casing 31 and through the lens 36. A plurality of screw fasteners 37 are situated between the door 34 and the mounting ring 33 to lock the lens door 34 in closed position.

Figure 2:
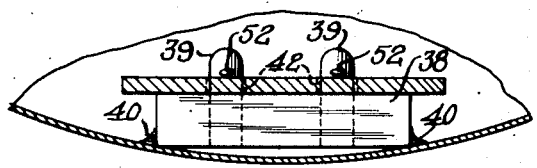
Figure 2 is a fragmentary cross-sectional view with parts shown in elevation taken substantially on line II—II of Figure 1.

Referring particularly to Figures 1 and 2, it will be noted that a pivot block 38 having a pair of spaced pivot pins 39 is mounted in the bottom of the casing 31 adjacent the closed end 32 and is firmly welded in place as at 40.

A pivot plate 41 is apertured at one end to provide suitable relief as at 42 for pivotally retaining the pivot plate 41 on the pivot block 38.

At the other end of the pivot plate 41 a yoke 43 having oppositely extending arms 44 and 46 is firmly connected as by welding shown at 47. Each of the arms 44 and 46 is apertured as at 44a and 46a to receive the pin end 48 of a threaded adjustment stud 49 threadedly received by one of a pair of spaced apertured bosses 50 provided on the casing 31. The adjustment studs 49 may be selectively vertically positioned by turning the head portions thereof indicated at 49a and selected vertical adjustments may be locked by means of a locknut 51 carried on each of the adjustment studs 49.

The pivot plate 41, together with the yoke 43 constitutes a cradle assembly which may be retained as a part of the casing structure by inserting a cotter pin 52 through each of the pivot pins 39.

Mounted on the pivot plate 41 is a channel-shaped retainer 53 having securely mounted therein a pair of axially extending cushioning pads 54 preferably made of a suitable elastic and resilient cushioning material. The pads 54 are retained in assembly with the retainer 53 and with the pivot plate 41 by means of a plurality of fasteners 56. When the warning light apparatus is inserted into the casing 31 the leg 11 of the frame 10 will directly engage the cushioning pads 54.

To lock the frame 10 in fully inserted position within the casing 31, a spring biased latch is provided between the leg 11 and the cradle assembly. More particularly, the spring biased latch comprises a latch knob 57 pinned to a latch pin 58 and having a detent head 59 received in an aperture 60 formed in the yoke 43 and the pivot plate 41. An annular shoulder 61 is provided on the latch pin 58 and serves to bottom a loading spring 62, the other end of the spring 62 engaging the leg 11 of the frame 10.

Referring now more particularly to Figures 3, 4 and 5 in connection with Figure 1, a hinge block 63 is firmly connected to the top of the casing 31 adjacent the closed end 32, for example, by means of welding shown at 64. A hinge 66 is firmly connected to the hinge block 63 to pivotally mount a hinge plate 67 extending away from the hinge 66 toward the open end of the casing 31. It will be noted that the pivot plate 41 and the hinge plate 67 are each pivotally connected at one end to the casing at diametrically opposed points and that the warning light apparatus is essentially inserted between the pivot plate 41 and the hinge plate 67. A channel-shaped retainer 68 is provided and a pair of resilient and elastic cushioning pads 69 are mounted in spaced relation within the retainer 68 to provide a longitudinally extending recess 70 therebetween, the pads 69, the retainer 68 and the hinge plate 67 being placed in firm assembly by means of a plurality of fasteners 71.

At the other end of the hinge plate 67 nearest the open end of the casing 31, a leaf spring 73 is clamped to the hinge plate 67 by means of a retainer 74 and a pair of clamp screws 76 engageable with the hinge plate 67. A channel-shaped guide member 77 having a guide pin 78 extending between opposed legs of the channel-shaped guide member 77 receives the other end of the leaf spring 73 so that sliding engagement between the leaf spring 73 and the casing 31 occurs whenever the hinge plate 67 is pivotally displaced.

When the warning light apparatus is inserted into the casing 31, the leaf spring 73 acting between the hinge plate 67 and the casing 31 loads the cushioning pad 69 into direct engagement with the leg 12 of the frame 10. The warning light apparatus is thus floatingly suspended in the casing and relative vertical adjustment in the casing 31 may be effected by adjusting the cradle assembly against the bias of the spring 73, thereby to control the beam alignment of the warning light.

A spring pressed latch 80 is carried by the leg 12 of the frame 10, the latch 80 including a latch pin 81 arranged to move through the groove, or recess 70 provided between the cushioning pads 69. The end of the latch pin 81 includes a detent portion 82 which is adapted to slidingly engage the channel-shaped retainer 68, an annular shoulder 83 being provided on the latch pin 81 to seat a coil spring 84 bottomed against the leg 12 of the frame 10.

Adjacent the relatively free end of the hinge plate 67 and the channel-shaped retainer 68 is provided an aperture 86 arranged in registry with the recess 70 to receive and seat the detent portion 82 of the latch pin 81 upon partial withdrawal of the frame 10 from the casing 31.

The latch pin 58 carried on the leg 11 and the latch 80 carried on the leg 12 are axially separated a predetermined distance so that the frame will be latchingly engaged just prior to complete removal thereof from the casing 31. Thus, when the frame 10 is fully inserted in the casing 31, the detent 59 of the latch pin 58 will be seated in the aperture 60 formed in the hinge plate 41 and the warning light apparatus will be secured in place. In order to withdraw the warning light apparatus from the casing 31, the latch knob 57 is lifted thereby releasing the detent 59 from the aperture 60. As the frame 10 is withdrawn from the casing 31, the latch pin 81 rides in the groove or recess 70 until the detent portion 82 comes in registry with the aperture 86 whereupon the frame 10 is again latched and further withdrawal movement is precluded until the latch knob of the latch 80 is lifted to release the detent 82 from the aperture 86 and to permit complete withdrawal of the frame 10 from the casing 31.

On the closed end 32 of the casing 31 is mounted a channel-shaped retainer 87 having a resilient and elastic cushioning pad 88 arranged to engage the frame 10. The cushioning pad 88, together with the retainer 87 is placed in firm assembly with the closed end 32 of the casing 31 by means of a plurality of fasteners 89.

It will be appreciated that the structure described above affords a fully resilient shockproof cushion mounting for the warning light structure.

Moreover, the use of the pivotally connected pivot plate and hinge plate affords a floating mount by means of which vertical beam alignment may be closely regulated and adjusted.

A particularly advantageous feature of the mounting arrangement described resides in the provision of the hand manipulable latches which do not require special tools. Thus, the warning light apparatus may be conveniently serviced by relatively inexperienced personnel.

Although various minor structural modifications might be suggested by those versed in the art, it should be understood that I wish to embody within the scope of this patent all such modifications as reasonably and properly come within the scope of my contribution to the art.

I claim as my invention:

1. A shockproof mounting arrangement for an electric warning light apparatus, comprising a casing having an open end, a pivot block in said casing having pivot pin means carried thereby, a cradle assembly comprising a pivot plate having one end retained for pivotal movement on said pivot block by said pivot pin means, said cradle assembly including a yoke on the other end of said pivot plate and having a pair of transversely extending arms, a pair of transversely spaced screws carried by said casing to engage said arms for vertically adjusting said cradle assembly relative to said casing, locknut means on each of said screws to lock said screws in selected vertical adjustment, cushioning means on said pivot plate, a U-shaped support frame member inserted in said casing, a warning light carried by said frame member and adapted to project a beam of light through the open end of said casing, one of the legs of said frame member engaging said cushioning means for vertically adjustable support by said cradle assembly, a spring biased detent member and mating recess means between said cradle assembly and said frame member to lock said frame in inserted assembly within said casing, a cushioning means engaging the other leg of said U-shaped frame member, a hinge plate retaining said cushioning means, a hinge pivotally connecting one end of said hinge plate to said casing, spring biasing means between said casing and said hinge plate to resiliently load said frame member and said cradle assembly in said casing, and a spring-biased detent member and mating recess means between said hinge plate and said frame member to prevent inadvertent disassembly of said member from said casing.

2. An electric warning light apparatus comprising, a casing open at one end, a pivot block in said casing having pivot pin means extending into said casing, a pivot plate having one end retained by said pivot pin means for pivotal movement relative to said pivot block, a yoke having oppositely extending arms on the other end of said pivot plate, electric warning light means inserted in said casing, said warning light means on said pivot plate being aligned to project a beam of light through the open end of said casing, and a pair of adjustment lock screws carried by said casing and engageable with said arms of said yoke to selectively vertically pivot said pivot plate around said pivot pin means for adjusting the beam alignment of said warning light means relative to said casing.

3. An electric warning light apparatus comprising, a casing open at one end, a pivot block in the bottom of said casing having pivot pin means extending into said casing, a pivot plate having one end retained by said pivot pin means for pivotal movement, a yoke having oppositely extending arms on the other end of said pivot plate, electric warning light means supported by said pivot plate to project a beam of light through the open end of said casing, a pair of adjustment lock screws carried by said casing and engageable with said arms of said yoke to selectively vertically pivot said pivot plate around said pivot pin means for adjusting the beam alignment of said warning light means relative to said casing, and resilient biasing means at the top of said casing engageable with said warning light means to floatingly mount said warning light in said casing.

4. An electric warning light apparatus comprising, a casing open at one end, electric warning light means inserted in said casing to project a beam of light through the open end of said casing, a pivotally mounted support cradle in the bottom of said casing to receive and carry said warning light means, adjustment means between the cradle and the casing to vertically adjust said cradle to control the beam alignment relative to said casing, and a stabilizer device in the top of said casing comprising a hinge plate pivotally carried at one end to said casing, and a spring between said casing in the other end of said hinge plate to bias said hinge plate against said warning light means, thereby to retain said warning light means in said casing.

5. In an electric warning light, a casing open at one end, a pair of axially extending plates in said casing, each having one end pivotally connected to said casing at diametrically opposed points adjacent the closed end of said casing, electric warning light means inserted between said plates to project a beam of light outwardly through the open end of said casing, an adjustable stop member carried by and extending into said casing engaging the other end of one of said plates, and a resilient spring between said casing and the other end of the other of said plates, thereby to clampingly retain said warning light means between said pivotally mounted plates in said casing.

6. In an electric warning light, a casing open at one end, a pair of plates in said casing each having one end pivotally connected to said casing at diametrically opposed points adjacent the closed end of said casing, said plates extending toward the open end of said casing, a resilient elastic cushioning pad means on each of said plates, electric warning light means inserted between said plates and directly engageable with said cushioning pads, said warning light means being aligned to project a beam of light outwardly through the open end of said casing, an adjustable stop carried by said casing engageable with the other end of one of said plates, and a resilient spring between said casing in the other end of the other said plates, said plates together operating to resiliently suspend said warning light means in said casing.

7. An electric warning light apparatus comprising, a casing open at one end, a warning light unit inserted in said casing to project an electric beam of light through the open end of said casing, a pivotally mounted support cradle in the bottom of said casing, a resilient elastic cushioning pad on said support cradle to receive and carry said warning light unit, means to vertically adjust said cradle to control the beam alignment relative to said casing, and a stabilizer device in the top of said casing comprising a hinge plate pivotally carried at one end to said casing, a resilient elastic cushioning pad on said hinge plate to engage said warning light unit, and a spring between said casing and the other end of said hinge plate to bias said hinge plate toward said warning light unit, thereby to retain said warning light unit in said casing.

8. An electric warning light apparatus, comprising, a casing open at one end, electric light source means including a frame member inserted in said casing through said open end, detent and recess means between said casing and said frame member to lock said frame in said casing, a resilient biasing means between said casing and one side of said frame member, an adjustable support member between said casing and the other side of said frame, and an adjustment means between said casing and said adjustable support member and having an accessible actuating portion extending exteriorly of said casing to adjust the alignment of said frame member in said casing.

9. An electric warning light apparatus, comprising, a casing, electric light source means including a frame member in said casing, a resilient biasing means between said casing and one side of said frame member, an adjustable support member between said casing and the other side of said frame member, and an adjustment means between said casing and said adjustable support member and having an accessible actuating portion extending exteriorly of said casing to adjust the alignment of said frame member in said casing.

10. An electric warning light comprising a casing open at one end, a frame member inserted in said casing and having electric light source means supported thereon to project a beam of light outwardly through the open end of the casing, and spring-bias detent means aligned with mating recess means between said casing and said frame member and locking said light source means in firm assembly in said casing.

11. An electric warning light comprising, a casing open at one end, a frame member having electric light source means supported thereon and being inserted into said casing, mating detent and recess means between said frame member and said casing to lock said frame member in said casing, an additional mating detent and recess means between said frame member and said casing engaging one another when only a portion of said frame member remains in said casing, said additional detent means being manually actuated to permit complete withdrawal of said frame member from said casing.

12. An electric warning light apparatus comprising, a casing open at one end, electric light source means including a frame member inserted into said casing through said open end, detent and recess means between said casing and said frame member to lock said frame member and said casing in firm assembly when said frame member is in fully inserted position in said casing, and additional detent and recess means between said casing and said frame member to temporarily lock said frame member and said casing in firm assembly after said frame member is partially withdrawn from said casing, said additional detent means being manually actuated to permit a complete withdrawal of said frame member from said casing.

13. An electric warning light comprising, a casing open at one end and having a pair of spaced apart recesses adjacent the closed end of the casing and adjacent the open end of the casing, respectively, electric light source means including a frame member inserted into said casing and having a spring biased detent member mating selectively in said recesses and locking said frame member in adjusted axial positions relative to said casing, one of said recesses receiving said detent member when said frame member is wholly received in said casing, the other of said recesses receiving said detent member when only a portion of said frame member remains in said casing.

ARTHUR C. HEEHLER.

References Cited in the file of this patent

UNITED STATES PATENTS

| Number | Name | Date |
|---|---|---|
| 1,969,089 | Merkel | Aug. 10, 1934 |
| 2,214,473 | Mann | Sept. 10, 1940 |
| 2,239,336 | Moore | Apr. 22, 1941 |
| 2,446,333 | Kennelly | Aug. 3, 1948 |